United States Patent [19]

Sato

[11] 4,325,774

[45] Apr. 20, 1982

[54] CORRECTION LABEL APPLYING DEVICE FOR PORTABLE LABEL PRINTING MACHINE

[75] Inventor: Yo Sato, Tokyo, Japan

[73] Assignee: Kabushiki Kaisha Sato Kenkyusho, Japan

[21] Appl. No.: 215,319

[22] Filed: Dec. 11, 1980

[30] Foreign Application Priority Data

Dec. 28, 1979 [JP] Japan .......................... 54-183457[U]

[51] Int. Cl.[3] ...................... B41F 13/24; B23K 27/00; B31F 5/04; B32B 31/00; B65C 9/34

[52] U.S. Cl. .................................... 156/542; 156/580; 156/556; 156/DIG. 27; 156/DIG. 37; 156/DIG. 49; 156/536; 101/233

[58] Field of Search ............... 156/542, 541, 580, 363, 156/583.8, 361, 384, 584, 576, 556, DIG. 1, DIG. 2, DIG. 19, DIG. 20, DIG. 27, DIG. 33, DIG. 39, DIG. 37, DIG. 48, DIG. 49; 101/233, 242

[56] References Cited

U.S. PATENT DOCUMENTS 3,440,123 4/1969 Hamisch, Sr. ...................... 156/556

3,814,651 6/1974 Wada ................................. 156/556

4,259,138 3/1981 Sato ........................... 156/DIG. 27

FOREIGN PATENT DOCUMENTS 54-142100 11/1979 Japan .................................. 156/542

*Primary Examiner*—Edward C. Kimlin
*Assistant Examiner*—L. Falasco
*Attorney, Agent, or Firm*—Ostrolenk, Faber, Gerb & Soffen

[57] ABSTRACT

A correction label applying device for use with a portable label printing machine is disclosed. The device comprises a price tag holding device for temporarily holding a price tag to be corrected. The price tag holding device is mounted on a guide at the underside of the portable label printing machine so as to be movable between an operative forward position, in which it holds a price tag or the like in a position to receive at a predetermined location thereon a correction label piece fed out by the portable label printing machine, and a rest rearward position, in which the price tag holding device is positioned rearwardly from the correction label exit of the printing machine so as not to interfere with the label printing machine being operated to print and apply a label in the usual manner.

14 Claims, 5 Drawing Figures

CORRECTION LABEL APPLYING DEVICE FOR PORTABLE LABEL PRINTING MACHINE

BACKGROUND OF THE INVENTION

1. Field of the Invention

The present invention relates to a correction label applying device for a portable label printing machine, for correcting the printing on price tags, tickets and the like.

2. Description of the Prior Art

It has been conventional to correct erroneous printing on price tags, for example, an incorrect price, by using a portable label printing and applying machine to apply a small label piece with corrected printing to the price tag as precisely as possible, for correcting the printed information. Attaching the label piece at the correct position on the price tag with sufficient precision is extremely difficult in practice, however, so that such work cannot be done quickly, and errors tend to occur.

One proposed correction label applying device detachably mounts a price tag holding device for correcting printed characters to a label printing machine (Japanese Laid-Open Patent Publication No. 54-142100 (1979). See U.S. application Ser. No. 32,378, (filed Apr. 23, 1979) now U.S. Pat. No. 4,259,138. This price tag holding device is detachable, however, and the price tag holding device is attached to the label printing machine only when correcting errors, being detached therefrom for normal use of the label printing machine. The necessary repeated attachment and detachment is inconvenient, and the price tag holding device may be lost.

SUMMARY OF THE INVENTION

It is the primary object of the present invention to provide an improved correction label applying device for a portable label printing and applying machine, which device is free from the above-described disadvantages of the prior art.

It is another object of the present invention to provide a correction label applying device comprising a price tag holding device which need not be detached from the main body of the label printing machine but which can instead be moved to and held in a rest position which permits the label printing machine to be used conveniently to print a label, whereby the inconvenience involved in attaching and detaching the price tag holding device and the danger of losing it are eliminated.

It is a further object of the present invention to provide a correction label applying device which is simple in structure but effective in practical use and inexpensive to manufacture.

Pursuant to the above objects, the correction label applying device of the present invention for a portable label printing machine comprises means for mounting on the main body of a portable label printing machine a price tag holding device which has an upper surface for holding a price tag to be corrected. Guiding means guides the mounted price tag holding device for motion between an operative position and a rest position, relative to the main body of the portable label printing machine. Locking means locks the price tag holding device in either position. The price tag holding device is moved by the user to one end of the guiding means when it is to be used and to the rest position at the other end of the guiding means when it is desired to use the label printing machine to print a label.

BRIEF DESCRIPTION OF THE DRAWINGS

Other objects and features of the invention will be apparent from the following description of a preferred embodiment of the invention with reference to the accompanying drawings, in which.

DESCRIPTION OF THE PREFERRED EMBODIMENT

Figure 1:
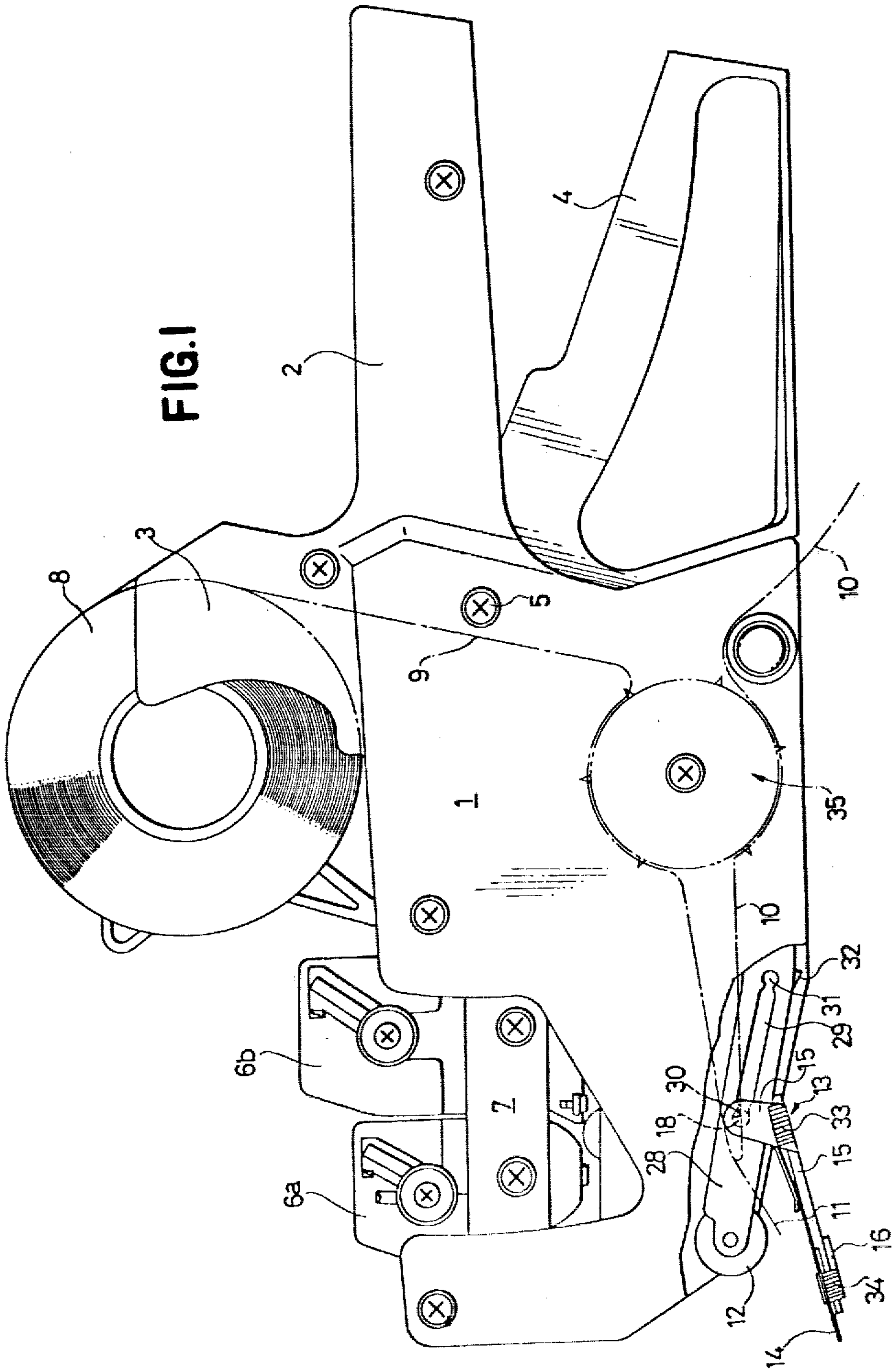
FIG. 1 is a view, partly in section, of a portable label printing machine showing one preferred embodiment of the label correcting device of the invention in position for use.

FIG. 1 is a side view of a label printing machine employing the label correcting device of the invention. A hand grip 2 is formed integrally with a machine frame 1 and extends to the rear of the frame (to the right in FIG. 1). A supporting section 3 for a label roll 8 is formed integrally with the upper part of the machine frame 1. A hand lever 4 is pivotably mounted to the machine frame 1 by a pivot shaft 5 below the hand grip 2. Yoke arms 7 with printing heads 6*a* and 6*b* mounted thereon are formed integrally with and move together with the front part of the hand lever 4.

A label strip 9 is fed in a known manner from the label roll 8 by squeezing and releasing of the hand lever 4, which cooperates with a feeding device 35 inside the machine frame 1 to advance the label strip 9 through the machine a predetermined distance each time the hand lever 4 is squeezed and released. The printing heads 6*a* and 6*b* print the label strip 9 as it moves through the machine. A backing paper 10 is separated from the label strip 9 in a known manner, and label pieces 11 are sequentially fed out below an applying roller 12 disposed at the lower front end of the machine frame 1.

Figure 2:
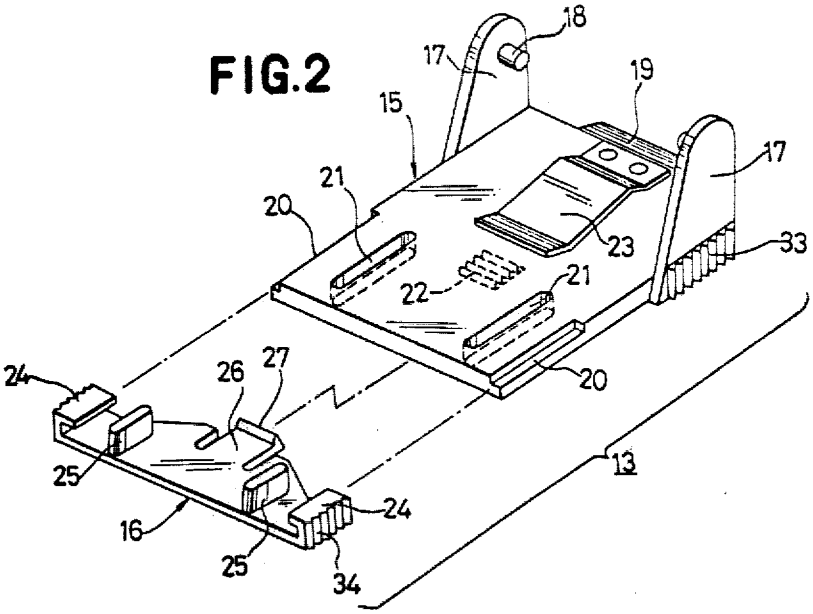
FIG. 2 is a partially exploded, perspective view of the price tag holding device of the label correcting device shown in FIG. 1.
Figure 3:
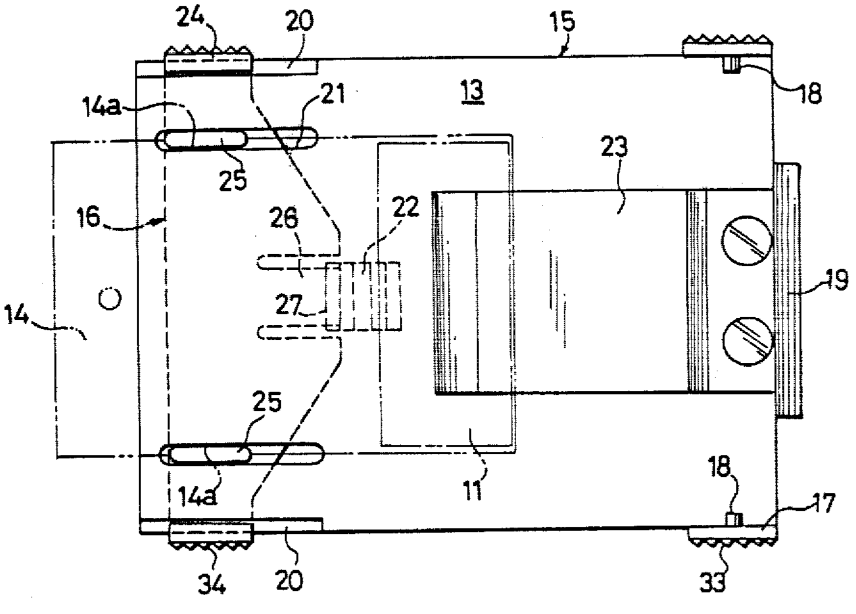
FIG. 3 is a plan view of the price tag holding device of FIG. 2.

A price tag holding device 13 included in the correction label applying device of the present invention is attached to the lower front end of the label printing machine. The price tag holding device 13, as shown in FIGS. 2 and 3, comprises a price tag holder 15 for supporting a price tag 14 on its upper surface, and an adjusting member 16 for adjusting the holding position of the price tag 14.

Side plates 17 stand upright on both sides of the rear end of the price tag holder 15. Engaging pins 18 are arranged on the inner surfaces of the side plates 17, facing each other. A locking member 19 with an inclined top surface is formed integrally with the rear end of the holder 15. Both front corners of the holder 15 are slightly recessed to form attaching grooves 20 for the adjusting member 16. Two slots 21 are formed between grooves 20. An indexing recess 22 with ribs and grooves is formed at substantially the center of the lower surface of the price tag holder 15. There is a price tag pushing spring whose rear end is securely fixed to the holder 15.

A respective hook-like retainer 24 stands upright at each side edge of the adjusting member 16. Locating projections 25, which are slidably engageable in the slots 21, stand upright between retainers 24. A spring flap 26 protrudes from the center of the rear side of the adjusting member 16 and has a pointed locking projection 27 standing upright at its rear end.

The adjusting member 16 is secured to the price tag holder 15 by inserting the locating projections 25 into the slots 21 of the price tag holder 15, engaging the locking projection 27 with the indexing recess 22, and engaging the hook-like retainers 24 in the attaching grooves 20. The adjusting member 16 may be held at a desired position with respect to the holder 15 by locating the locking projection 27 in a suitable groove of the indexing recess 22.

Figure 4:
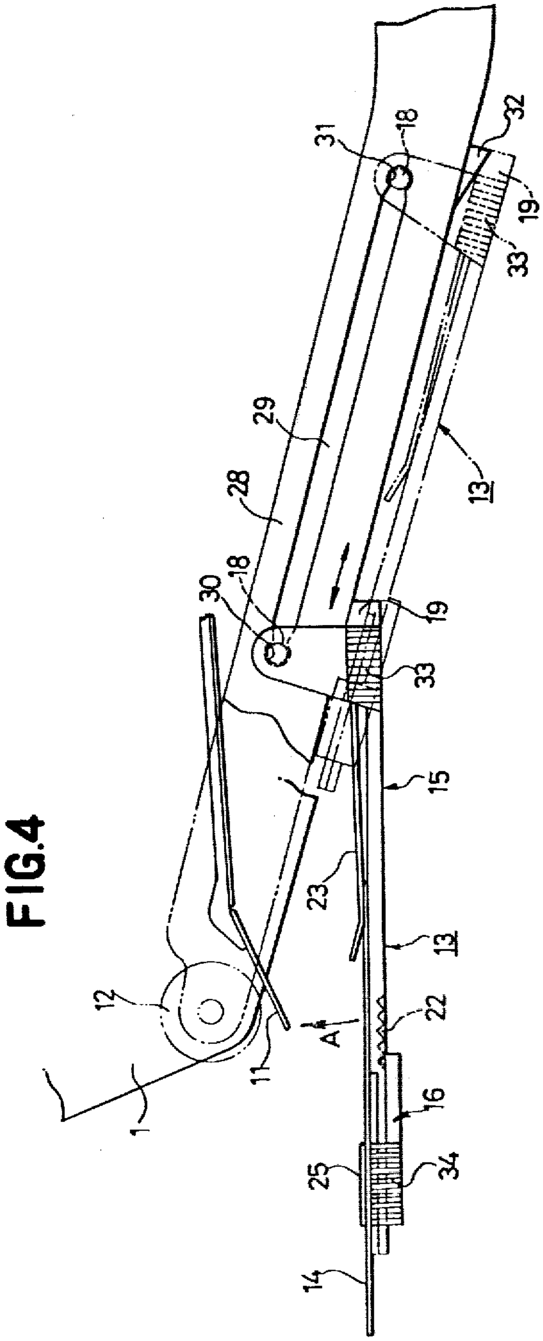
FIG. 4 is an enlarged side view of a portion of the label printing machine of FIG. 1.

The price tag holding device 13, comprising the combination of the price tag holder 15 and the adjusting member 16, is secured to a bottom cover 28 of the label printing machine in the preferred embodiment shown. The bottom cover 28 is mounted pivotably about the axis of the applying roller 12, as is conventional. Elongate grooves 29 are formed in the side plates of the bottom cover as guiding means engageable with the engaging pins 18 of the price tag holder 15. Locking sections 30 and 31 are formed at both ends of the elongate grooves 29 for locking the engaging pins 18 forward in the front end locking sections 30, as shown in FIGS. 1 and 4, when the price tag holding device 13 is in use, and for locking the pins 18 rearward in the rear end locking sections 31 when the price tag holding device 13 is not in use. Each locking section 30 and 31 is preferably circular and is defined by a narrowing of the elongate groove 29, which narrowing also separates it from the main portion of the elongate groove 29. A wedge-shaped stopper 32 is securely fixed to the lower surface of the bottom cover 28 near the rear end locking sections 31.

The operation of this correction label applying device is now described. Prices and other information are generally printed in several rows on tag cards, such as price tags and tickets. When it is necessary to correct a portion of the information printed on such a price tag or ticket, the price tag holding device 13 is located at a predetermined position relative to the label printing machine, in which position the engaging pins 18 engage front end locking sections 30, as shown in FIG. 1. This position is the operative position of the price tag holding device 13.

The price tag holding device 13 is located at the rear side of the label printing machine when not in use, as shown by the two-dot chain lines in FIG. 4. When the correction label applying machine is to be used, the price tag holding device 13 is lightly pressed forward, being grasped by the user by means of holding portions 33 which are provided on each side of it. This action releases the engaging pins 18, which have been locked in the rear end locking sections 31 of the elongate grooves 29 of the bottom cover 28, from the locking sections 31. The pins 18 are slid along the elongate grooves 29 to move the price tag holding device 13 forward, and are locked in the front end locking sections 30 of the elongate grooves 29.

Figure 5:
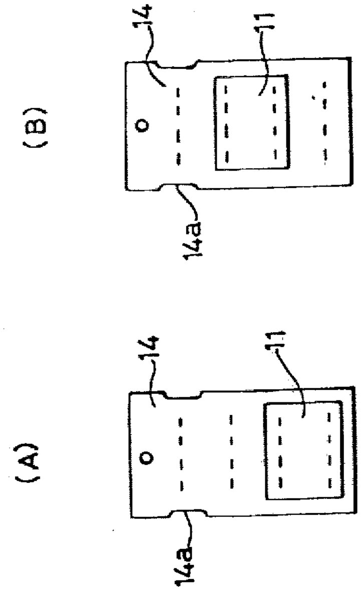
FIG. 5(A) is a plan view of a price tag to which a correction label piece is attached.
FIG. 5(B) is a plan view of another example of the same.

The printing heads 6*a* and 6*b* of the label printing machine are then operated to align the desired printing types in the printing position. The end portion of the price tag 14 to be corrected is inserted, from the front end of the price tag holding device 13, between the price tag pushing spring 23 and the upper surface of the price tag holder 15, as shown in FIG. 3. The price tag 14 is held in a predetermined position by means of notches 14*a* (FIG. 5), which are formed at both side edges of the price tag 14 and which engage the locating projections 25 of the adjusting member 16.

The hand lever 4 of the label printing machine is now squeezed and released once, and the label piece 11 bearing the corrected information is separated from the backing paper 10 and is fed out below the applying roller 12. The price tag holding device 13 is pressed toward the applying roller 12 by being pivoted in the direction of the arrow A in FIG. 4, i.e., in the clockwise direction, by means of the user pressing the front lower end of the label printing machine with a finger or against a work table, or the like, clamping the price tag 14 and the label piece 11 between the applying roller 12 and the upper surface of the price tag holder 15 so that the front end of the label piece 11 is applied at the predetermined position on the price tag 14. When the price tag 14 is pulled forward while still clamped against the applying roller 12, the rear side of the label piece 11 is also applied to the price tag 14 by the applying roller 12, and the correction is completed (FIG. 5(A)).

When it is desired to change the location on the price tag 14 at which the label piece 11 is to be applied, as shown in FIG. 5(B), the user grips holding portions 34 at both sides of the adjusting member 16 and slides the adjusting member 16 with respect to the price tag holder 15, to lock the locking projection 27 with another groove of the indexing recess 22 of the holder 15. This adjustment changes the positions of the locating projections 25 and the holding position of the price tag 14, thus changing the portion of the price tag 14 to which the label piece 11 is applied.

When the correction of the price tag 14 has been completed according to the above operation, the price tag holding device 13 is lightly pressed backward as the user grips the holding portions 33. This releases the engaging pins 18 from the front end locking sections 30 of the elongate grooves 29. The price tag holding device 13 is pressed backward to slide the engaging pins 18 along the elongate grooves 29. When the pins 18 approach the rear ends of the elongate grooves 29, the inclined top surface of the locking member 19 at the rear end of the price tag holder 15 engages the inclined surface of the stopper 32 or the lower surface of the bottom cover 28.

When the price tag holding device 13 is pressed further toward the back, the engagement of the stopper 32 with the locking member 19 is reinforced, and the locking pins 18 are locked in the rear end locking sections 31 of the elongate grooves 29. The cooperating inclines of the stopper 32 and the locking member 19 hold the device 13 pivoted upraised against the cover 28. As a result, the position of the price tag holding device 13 is fixed as shown by the two-dot chain lines of FIG. 4. Because the front end of the price tag holding device 13 is held securely against the bottom cover 28 by the engagement of the inclined surface of the stopper 32 with the locking member 19, the price tag holding device 13 will not swing away from the lower surface of the label printing machine and thus will not interfere with normal label applying work.

Although the price tag holding device 13 is attached to the bottom cover 28 of the label printing machine in the above embodiment, the present invention is not limited to this particular construction. The price tag holding device 13 may, for example, be mounted directly on the machine frame 1, or any other convenient arrangement may be used. The guiding means of the price tag holding device 13 need not comprise elongate grooves 29, but may be elongate holes, guide rails or the like.

The price tag holding device of the invention can be made for use with price tags without side notches 14*a*. One such price tag holding device has a stopper at the front end of the adjusting member for positioning the price tag, as disclosed in the above-mentioned Japanese Laid-Open Patent Publication No. 54-142100 (1979), or it may be adapted to permit adjustment of the position of the guides on the side edges according to the width of the price tag.

In summary, with the correction label applying device of the present invention, the price tag holding device attached to the label printing machine need not be detached from the machine when not in use, but may be moved and locked in a rest position where it will not interfere with the normal operation of the label applying device. As a result, it is not necessary to attach and detach the price tag holding device every time it is used, and the price tag holding device is therefore not likely to be lost. The correction of the price tags can be performed quickly and smoothly.

Although the present invention has been described in connection with a preferred embodiment thereof, many variations and modifications will now be apparent to those skilled in the art. The scope of the present invention is therefore to be limited not by the specific details of the preferred embodiment disclosed herein, but only by the appended claims.

What is claimed is:

1. A correction label applying device for use in conjunction with a label applicating machine, said device comprising:

price tag holding means for holding a price tag or the like which is to be corrected; and mounting means for mounting said price tag holding means on a label applicating machine for permitting said price tag holding means to be moved between a first and a second position; in said first position, said price tag holding means being adapted to hold a price tag or the like in an applicating position relative to the label applicating machine so that the price tag or the like will receive a label piece fed out by the label applicating machine; in said second position, said price tag holding means being located remote from said applicating position; and when said correction label applying device is mounted on the label applicating machine, said second position being sufficiently remote from said applicating position that said price tag holding means, when in said second position, will not block the application by the label applicating machine of a label to an article other than a price tag or the like held on said price tag holding means.

2. The device of claim 1, wherein said price tag holding means is rotatable while in said first position to bring a price tag or the like held by it into contact with a label piece fed out by the label printing machine.

3. The device of claim 1, wherein said mounting means further comprises guiding means for guiding said price tag holding means for movement between said first and second positions.

4. The device of claim 3, wherein said guiding means has a first portion adapted to be mounted nearer to an applicating zone of the label applicating machine and having a second portion adapted to be mounted more remote from the applicating zone than said first portion.

5. The device of claim 3, wherein said guiding means comprises means defining elongate grooves, and wherein said price tag holding means has engaging pins which engage respective ones of said elongate grooves.

6. The device of claim 3, wherein said mounting means comprises front and rear locking means for locking said price tag holding means in said first and second positions, respectively.

7. The device of claim 6, wherein said guiding means comprises elongate grooves and said price tag holding means has engaging pins which engage respective ones of said elongate grooves.

8. The device of claim 7, wherein each said locking means comprises a narrowing at a predetermined position along said elongate grooves, for engaging said engaging pins and preventing sliding thereof, along said elongate grooves.

9. The device of claim 2, wherein said price tag holding means has an upper surface and has spring means disposed thereon for holding a price tag or the like on said upper surface.

10. The device of claim 2, further comprising an adjusting member for adjustably defining a position in which a price tag or the like is held on said price tag holding means.

11. The device of claim 10, wherein said adjusting member is adapted to be slidable along said price tag holding member for adjusting said position in which a price tag or the like is held thereon.

12. The device of claim 11, wherein said price tag holding means has an indexing recess having a plurality of ribs defined therein, and wherein said adjusting member has a locking projection for engaging a selected said rib in said indexing recess.

13. The device of claim 11, wherein said price tag holding means has slots formed therein and wherein said adjusting member has locating projections engaging respective ones of said slots and being slidable therein; said locating projections being adapted to engage the side edges of a price tag or the like held on said price tag holding member.

14. In combination, a label applicating machine and a correction label applying device, said combination comprising:

a label applicating machine comprising applicator means for applying a label to a selected article and having an applicating zone at which a label is applied by said applicating means; and a correction label applying device mounted on said label applicating machine, said correction label applying device comprising:

price tag holding means for holding a price tag or the like which is to be corrected; and mounting means securing said price tag holding means to said label applicating machine and permitting said price tag holding means to be moved between a first and a second position; in said first position, said price tag holding means being adapted to hold a price tag or the like in an applicating position so that the price tag or the like will receive a label piece fed out by the label applicating machine; in said second position, said price tag holding means being located sufficiently remote from said applicating position that said price tag holding means, when in said second position, will not block the application by said applicating means of a label to a selected article other than a price tag or the like held on said price tag holding means.

* * * * *